United States Patent
Marukame et al.

(10) Patent No.: US 9,164,704 B2
(45) Date of Patent: Oct. 20, 2015

(54) SEMICONDUCTOR STORAGE DEVICE FOR HANDLING WRITE TO NONVOLATILE MEMORIES WITH DATA SMALLER THAN A THRESHOLD

(71) Applicant: KABUSHIKI KAISHA TOSHIBA, Tokyo (JP)

(72) Inventors: Takao Marukame, Tokyo (JP); Takahiro Kurita, Kanagawa (JP); Yuki Sasaki, Kanagawa (JP); Jiezhi Chen, Kanagawa (JP); Yusuke Higashi, Kanagawa (JP); Yuichiro Mitani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 14/090,597

(22) Filed: Nov. 26, 2013

(65) Prior Publication Data

US 2014/0189217 A1    Jul. 3, 2014

(30) Foreign Application Priority Data

Dec. 27, 2012  (JP) ................................. 2012-284909

(51) Int. Cl.
G06F 12/10     (2006.01)
G06F 3/06      (2006.01)
G06F 12/02     (2006.01)

(52) U.S. Cl.
CPC .............. *G06F 3/0679* (2013.01); *G06F 3/061* (2013.01); *G06F 3/0656* (2013.01); *G06F 12/0246* (2013.01); *G06F 12/0292* (2013.01); *G06F 2212/7201* (2013.01)

(58) Field of Classification Search
CPC .. G06F 12/0246; G06F 12/0292; G06F 3/061
USPC .................................................. 711/103, 202
See application file for complete search history.

(56) References Cited

U.S. PATENT DOCUMENTS

2013/0246732 A1*  9/2013  Seng et al. ..................... 711/203
2013/0311712 A1*  11/2013  Aso ............................... 711/103

FOREIGN PATENT DOCUMENTS

JP           4672742         1/2011

OTHER PUBLICATIONS

D. Rollins, "A Comparison of Client and Enterprise SSD Data Path Protection," Micron Technology, Inc. Technical Marketing Brief (2011), pp. 1-6.

* cited by examiner

*Primary Examiner* — Than Nguyen
(74) *Attorney, Agent, or Firm* — Finnegan, Henderson, Farabow, Garrett & Dunner, L.L.P.

(57) ABSTRACT

According to an embodiment, a semiconductor storage device includes a first storage unit, a read control unit, a second storage unit, and a write control unit. The first storage unit is configured to store data supplied from a host device. The read control unit is configured to perform control of reading the data in accordance with a read request. The second storage unit is configured to store a logical address used for reading the data from the first storage unit by the read control unit. The write control unit is configured to perform control of adding the stored logical address to the data and write the resulting data into the first storage unit in a case where a size of the data requested to be written into the first storage unit by the host device is smaller than a threshold.

12 Claims, 9 Drawing Sheets

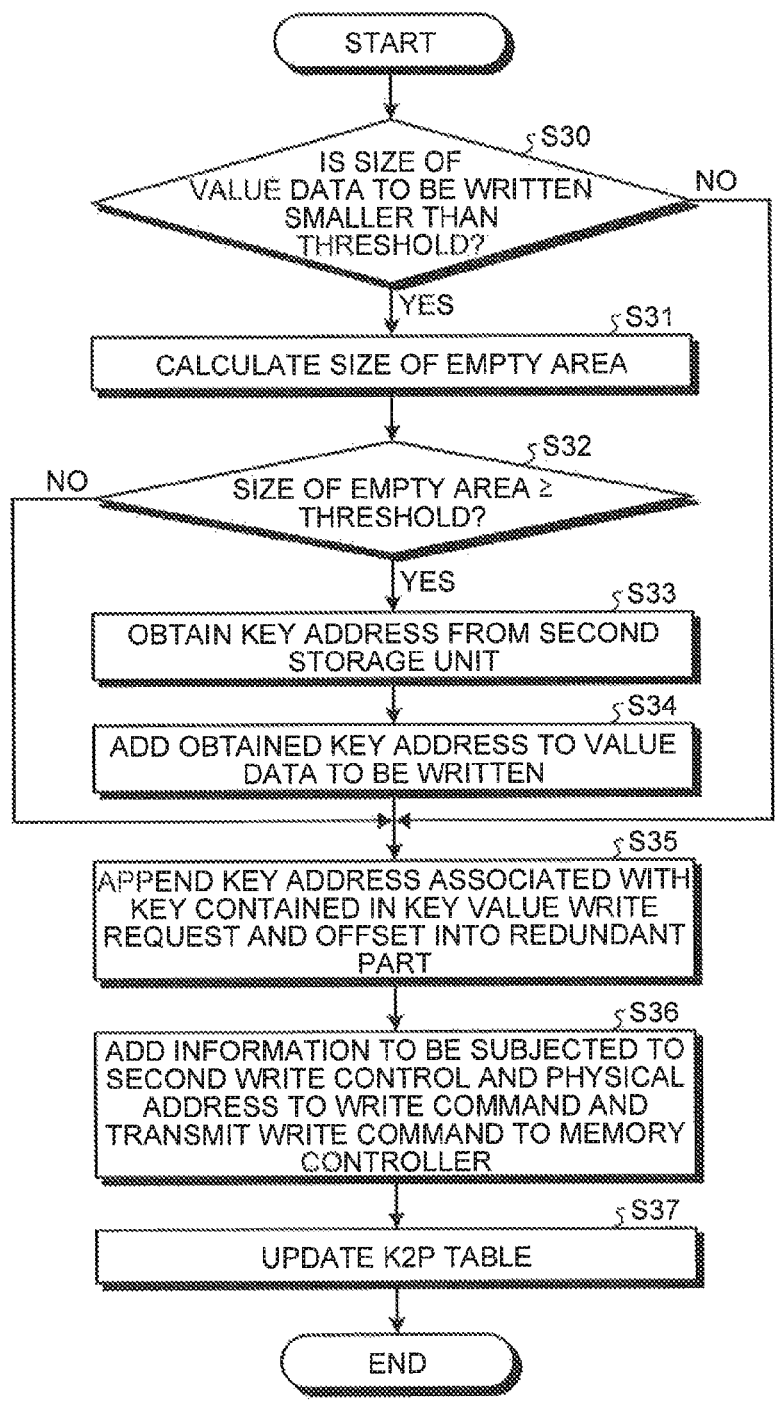

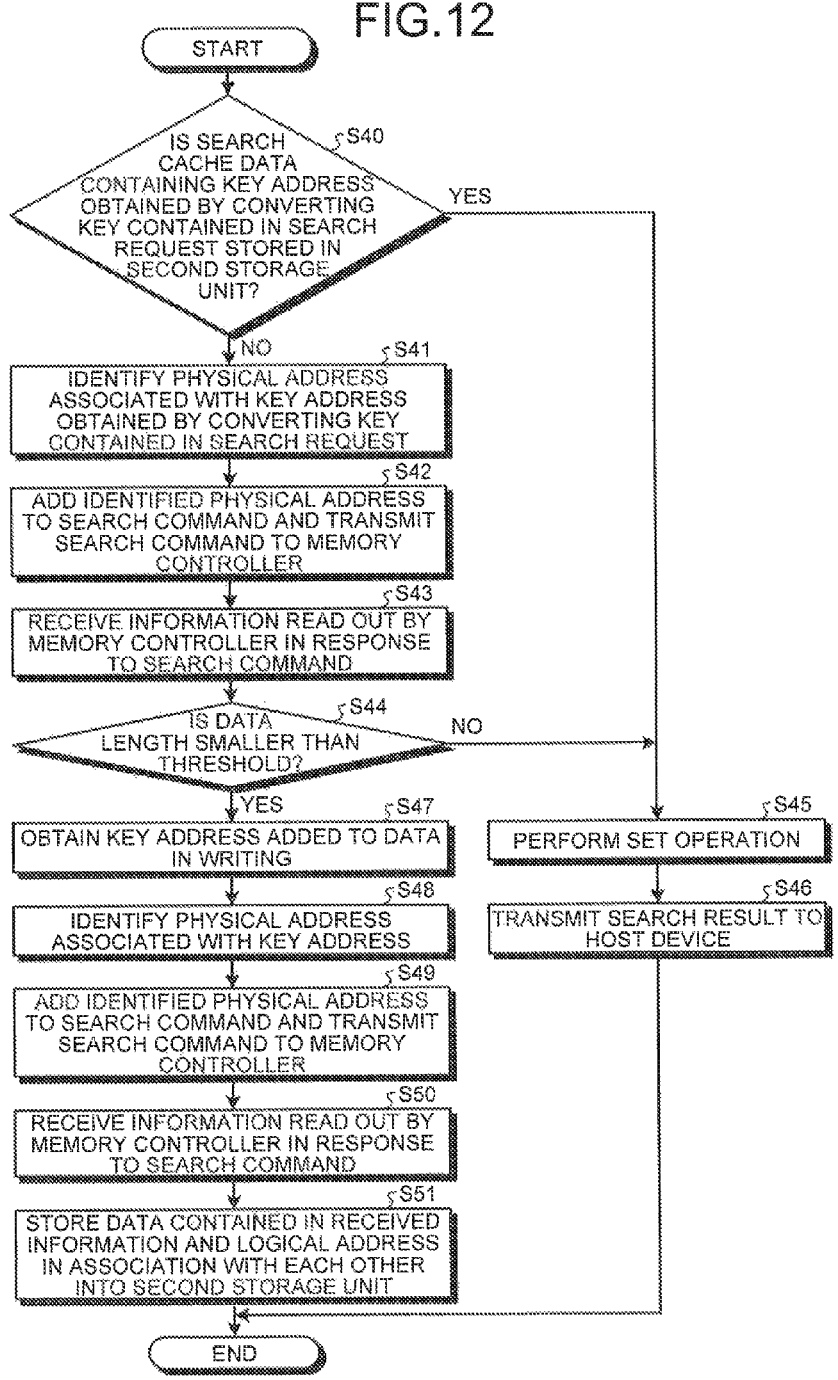

SEMICONDUCTOR STORAGE DEVICE FOR HANDLING WRITE TO NONVOLATILE MEMORIES WITH DATA SMALLER THAN A THRESHOLD

CROSS-REFERENCE TO RELATED APPLICATION

This application is based upon and claims the benefit of priority from Japanese Patent Application No. 2012-284909, filed on Dec. 27, 2012; the entire contents of which are incorporated herein. by reference.

FIELD

Embodiments described herein relate generally to a semiconductor storage device.

BACKGROUND

As examples of storage devices included in general host systems such as computer systems, there are magnetic hard disk drives (HDD), solid state drives (SSD) having nonvolatile semiconductor memories such as NAND flash memory mounted thereon, and embedded NAND flash memory. SSDs and embedded NAND flash memory are classified as storages, but can also be described as memory systems with extended sizes.

Such a memory system includes an interface, a first memory block, a second memory block and a controller, for example. The first memory block stores data, and the second memory block is a buffer memory for writing/reading data.

Description will be given considering an SSD as a system of the related art. Herein, an SSD refers to a storage constituted by NAND flash-based solid-state memory in a broad sense and also includes a NAND flash memory embedded system. Since writing to NAND flash memory is performed in units of a page, there is a disadvantage that a large number of data write requests in smaller units (requests to write data smaller than a page size) results in many empty areas in the NAND flash memory and thus results in decrease in the use efficiency.

BRIEF DESCRIPTION OF THE DRAWINGS

FIG. 11 is a chart illustrating an example of control performed by a second write control unit according to the second embodiment; and FIG. 12 is a chart illustrating an example of control performed by a search control unit according to the first embodiment.

DETAILED DESCRIPTION

According to an embodiment, a semiconductor storage device includes a first storage unit, a read control unit, a second storage unit, and a write control unit. The first storage unit is configured to store data supplied from a host device. The read control unit is configured to perform control of reading the data in accordance with a read request. The second storage unit is configured to store a logical address used for reading the data from the first storage unit by the read control unit. The write control unit is configured to perform control of adding the stored logical address to the data and write the resulting data into the first storage unit in a case where a size of the data requested to be written into the first storage unit by the host device is smaller than a threshold.

An outline of an embodiment will be described before describing embodiments of the semiconductor storage device. Here, an example in which a first storage unit that stores data supplied from a host device is AND flash memory will be described. The size of metadata such as a tag handled by a search memory is smaller than the page size (8 KB, for example) of the NAND flash memory. Thus, in a case where data such as a tag smaller than the page size is written in the NAND flash memory, an empty area is produced in a storage area of one pace reserved in the NAND flash memory as a result of the writing.

In practice, it is known from a result of analysis of use cases of NAND flash memory in personal computers and mobile phones that small data of 4 KB or smaller are frequently written. Note that, when use cases in reading and writing of data are considered, data to be written is likely to have relationship with data previously read out. For example, a case of opening a presentation file while a document file is open and updating and saving the presentation file on a personal computer is assumed. Since the document file may also be read when the presentation file is read afterward, storing data read previously in association with data to be written allows efficient retrieval of the association when the written data is read out.

A significant difference based on an essential difference between memories such as NAND flash memory from/to which reading/writing is performed in units of pages and other memories is that, even NAND flash memory is suitable for increasing the capacity, the capacity may not be made use of depending on use cases because writing is performed in units of pages.

Figure 1:
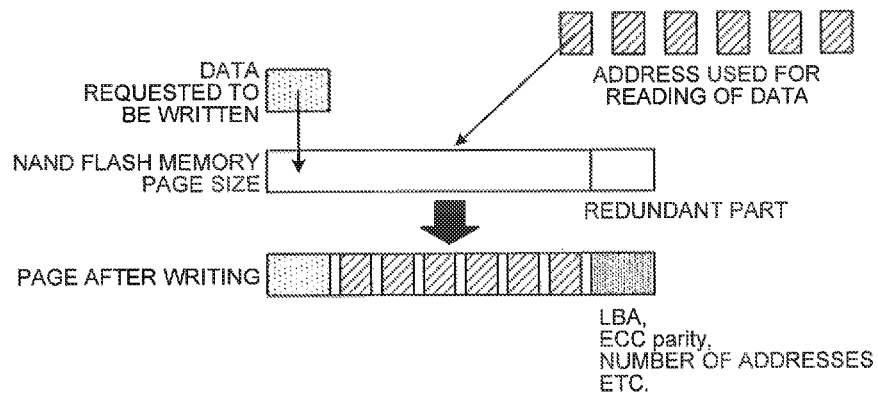
FIG. 1 is a conceptual diagram for explaining an outline of an embodiment.

In view of the aforementioned circumstances, a feature of the embodiment is that writing as much information that will be valuable when reading as possible in empty areas of pages is found to be useful in increasing the speed of a memory system in practical use. As illustrated in FIG. 1, according to the embodiment, in a case where the size of data requested to be written into NAND flash memory (hereinafter may be referred to as "data to be written") is smaller than a page size representing the unit size for writing (more specifically, in a case where the proportion of data to be written in a page is smaller than a threshold (50%, for example), an address last stored in a buffer memory (corresponding to a "second storage unit" in the claims) that is not illustrated and in which the history of addresses used for reading data is read out from the buffer memory and added to the data to be written so that there will be no empty area in the area other than a redundant part of the page. Then, predetermined redundant information (such as a logical address specified by a host device for the data requested, an ECC, a parity, and the number of addresses) is appended into the redundant part of the page, and the page is written into the NAND flash memory.

When reading of the data written in the NAND flash memory is requested afterward, the address added in writing is also read out together with the written data. As a result of reading out data associated with the read address from the NAND flash memory and holding the data in the buffer memory (that is, performing look-ahead), the data read ahead can be transmitted to the host device without accessing the NAND flash memory when reading of the data is request, which allows efficient reading of data strongly correlated with the written data.

Embodiments of the semiconductor storage device will be described below in detail with reference to the accompanying drawings.

First Embodiment

Figure 2:
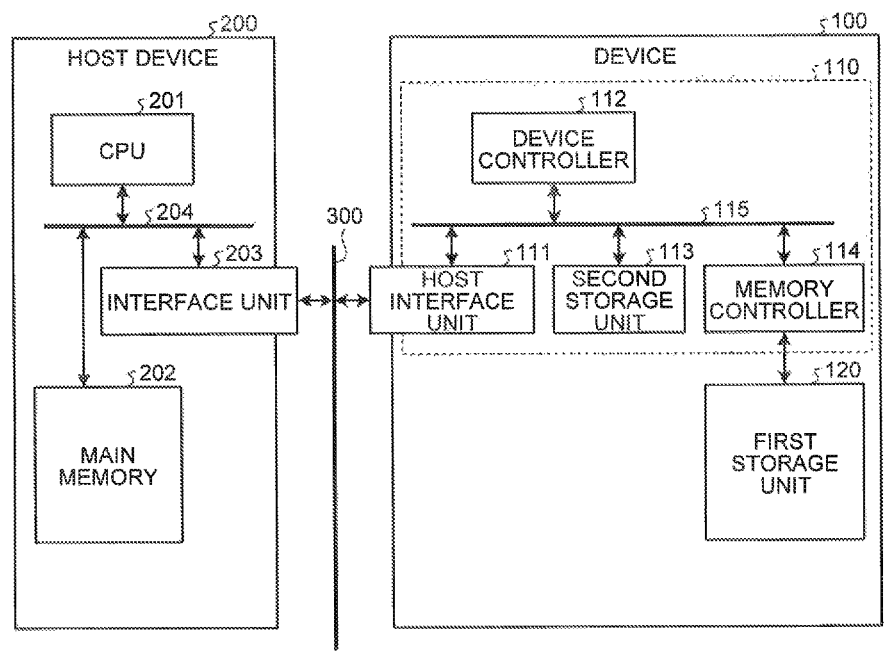
FIG. 2 is a diagram illustrating an exemplary hardware configuration of a semiconductor storage device according to a first embodiment.

FIG. 2 is a block diagram illustrating an example of hardware configurations of a device 100 that is a semiconductor storage device and a host device 200 according to a first embodiment. As illustrated in FIG. 2, the host device 200 includes a CPU 201, a main memory 202, and an interface unit 203 to connect to the device 100, which are connected with one another via a bus 204.

The device 100 includes a controller chip 110 and a first storage unit 120. The controller chip 110 includes a host interface unit 111, a device controller 112, a second storage unit 113, and a memory controller 114, which are connected to one another via a bus 115. In the device 100, a high-speed and efficient bus line arrangement is desirable. In the meantime, two or more types of bus lines may be used in the device 100 depending upon a difference between interface standards and external interface standards, for example.

Furthermore, in the example of FIG. 1, the first storage unit 120 is connected to the controller chip 110 via the memory controller 114. The first storage unit 120 is a device capable of storing data supplied from the host device 200 (from a different perspective, data to be used by the host device 200). In the present embodiment, the first storage unit 120 is a NAND flash memory, but is not limited thereto. Alternatively, the first storage unit 120 may be constituted by a plurality of chips so as to increase the storage capacity. The first storage unit 120 is not limited to the above, and any storage medium can be applied thereto as long as it is a semiconductor memory having memory nonvolatility. Examples of the first storage unit 120 include nonvolatile memories such as an MRAM (magnetoresistive random access memory), an ReRAM (resistance random access memory), an FeRAM (ferroelectric random access memory), and a PCRAM (phase-change random access memory).

The host device 200 (the interface unit 203) is connected to the host interface unit 111 of the device 100 via an external bus 300 such as an AMBA (advanced microcontroller bus architecture). For example, the host interface unit 111 is appropriately selected from an SATA (serial advanced technology attachment), a PCI Express, an eMMC (embedded MMC), a UFS ((universal flash storage)), a USB (universal serial bus) and the like.

The host interface unit 111 can receive requests from the host device 200, which is a host device of the device 100. For example, the host interface unit 111 can receive a write request requesting to write data into the first storage unit 120 and a read request requesting to read data from the first storage unit 120 from the host device 200. In this example, a write request contains information requesting execution of writing, data requested to be written, and a logical address indicating the place to which the data requested to be written is assigned among virtual space addresses in a program. A read request contains information requesting execution of reading, and a logical address indicating the place to which data requested to be read is assigned among virtual space addresses in a program. The logical address is specified by the host device 200.

The device controller 112 is a control device configured to control writing of data into the first storage unit 120 and reading of data from the first storage unit 120 in response to a request from the host device 200 received by the host interface unit 111. Detailed functions of the device controller 112 will be described later.

The second storage unit 113 is a memory smaller than the first storage unit 120 but higher in resistance to rewrite/read than the first storage unit 120. The second storage unit 113 has a work area for storing various computation results of the device controller 112 and the memory controller 114 to be described later. The second storage unit 113 also has an area for storing the history of logical addresses used for reading data (the history of logical addresses associated with read data). Details of the second storage unit 113 will be described later. The second storage unit 113 may be nonvolatile so that data stored in the second storage unit 113 will not be lost even when power is cut off. For example, when the first storage unit 120 is a NAND flash memory, the second storage unit 113 can be an MRAM, a PCRAM, an ReRAM, an FeRAM or the like.

The memory controller 114 is a hardware module having functions of writing data supplied from the host device 200 into the first storage unit 120 and reading data stored in the first storage unit 120 under the control by the device controller 112. Detailed functions of the memory controller 114 will be described later.

Figure 3:
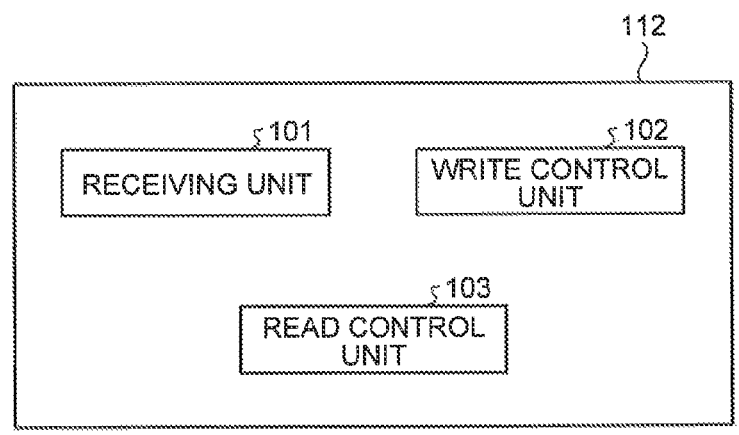
FIG. 3 is a diagram illustrating an exemplary functional configuration of a device controller according to the first embodiment.

Next, detailed functions of the device controller 112 will be described. FIG. 3 is a block diagram illustrating an exemplary functional configuration of the device controller 112. As illustrated in FIG. 3, the device controller 112 includes a receiving unit 101, a write control unit 102, and a read control unit 103. The receiving unit 101 receives requests from the host device 200.

When a write request is received by the receiving unit 101, the write control unit 102 performs control (may also be referred to as "write control") of writing information containing data requested to be written (data contained in the write request; hereinafter may also be referred as "data to be written") into the first storage unit 120. As will be described later, information on which write control is to be performed may contain a logical address added to the data to be written in addition to the predetermined redundant information. In the present embodiment, the write control unit 102 generates a write command instructing to perform writing, adds information (information on which write control is to be performed) containing data to be written and a physical address indicating an area in the first storage unit 120 where the data to be written is to be written to the generated write command, and transmits the write command to the memory controller 114.

Note that writing of the information including data and redundant information into the first storage unit 120 is performed in ascending order of pages regardless of the logical addresses.

In a case where the size of the data to be written is smaller than a threshold, the write control unit 102 performs control of adding the logical address (the logical address used for reading data) stored in the second storage unit 113 to the data to be written and write the resulting data into the first storage unit 120. More specifically, in a case where the size of the data to be written is smaller than the page size representing the unit for writing, the write control unit 102 performs control of adding the logical address stored in the second storage unit 113 to the data to be written and write the resulting data into the first storage unit 120. Still more specifically, in a case where the proportion of the data to be written in a page (the proportion of the data to be written with respect to the page size) is smaller than 50%, the write control unit 102 performs control of adding the logical address stored in the second storage unit 113 to the data to be written so that there will be no empty area other than the area for the redundant part in the page, append at least an offset representing information allowing the length of the data to be written to be obtained into the redundant part, and write the resulting data into the first storage unit 120. In this case, the information on which write control is to be performed includes the data to be written having a size smaller than the threshold, the logical address added to the data to be written, and the redundant information (at least containing an offset) described in the redundant part.

Furthermore, the write control unit 102 performs control of updating logical-to-physical translation information indicating an association between the logical address specified by the host device 200 and the physical address indicating the position in the first storage unit 120 each time the write control unit 102 performs the write control. More specifically, the write control unit 102 performs control of newly adding the logical address contained in the write request received from the host device 200 and the physical address indicating the position (area) in the first storage unit 120 into which the data to be written is written in association with each other to the logical-to-physical translation information each time the write control unit 102 performs the write control. In this example, the logical-to-physical translation information has a data structure in a form of a table and the body thereof is stored in the first storage unit 120. For performing logical-to-physical translation, the logical-to-physical translation information is read into the second storage unit 113 and used. In the following description, the logical-to-physical translation information in the present embodiment will be referred to as a "logical-to-physical translation table" (may also be referred to as an "L2P table"). In the present embodiment, the content of the logical-to-physical translation table is updated each time write control is performed by the write control unit 102.

Next, functions of the read control unit 103 will be described. When a read request is received by the receiving unit 101, the read control unit 103 performs control (hereinafter may also referred to as "first read control") of referring to the logical-to-physical translation table to identify the physical address associated with the logical address contained in the read request (performs logical-to-physical translation), and control of reading out information stored in the location indicated by the identified physical address. In the present embodiment, the read control unit 103 generates a read command to instruct the memory controller 114 to perform reading, adds the physical address obtained by the logical-to-physical translation to the generated read command, and transmits the read command to the memory controller 114. Then, the read control unit 103 can receive the information read out from the first storage unit 120 by the memory controller 114 as a response to the read command.

When a logical address added to the data by the write control unit 102 is contained in the information read according to the first read control, the read control unit 103 refers to the logical-to-physical translation table to identify the physical address associated with the logical address added to the data by the write control unit 102. In the present embodiment, the read control unit 103 refers to the offset contained in the information read according to the first read control, and obtains the logical address added to the data in writing from part of the read information other than the data and the redundant part if it is determined that the data length is smaller than the threshold in this example, if it is determined that the proportion of the data length with respect to the page is smaller than 50%). The read control unit 103 then refers to the logical-to-physical translation table to identify the physical address associated with the obtained logical address.

The read control unit 103 performs control (hereinafter may also referred to as "second read control") of reading information stored at the position in the first storage unit 120 indicated by the physical address identified as described above. In the present embodiment, the read control unit 103 generates a read command to instruct the memory controller 114 to perform reading, adds the physical address identified as described above to the generated read command, and transmits the read commend to the memory controller 114. The read control unit 103 can receive the information read out from the first storage unit 120 by the memory controller 114 as a response to the read command. The read control unit 103 then performs control of storing the data contained in the information read out according to the second read control and the logical address in association with each other into the second storage unit 113.

Accordingly, a physical address used for second read control and data are stored in association with each other into the second storage unit 113 each time the second read control is performed. In the following description, a combination of a logical address used in second read control and data associated with the logical address stored in the second storage unit 113 may be referred to as cache data.

When a logical address matching the logical address contained in the read request received by the receiving unit 101 and data are stored in association with each other in the second storage unit 113, the read control unit 103 performs third read control of reading the data associated with the logical address matching the logical address contained in the read request from the second storage unit 113. In other words, when there is cache data containing a logical address matching the logical address contained in the read request is present among one or more cache data stored in the second storage unit 113, the read control unit 103 performs control of reading data contained in the cache data. In this case, the read control unit 103 need not perform control of reading out data from the first storage unit 120, which can increase the reading speed.

Furthermore, each time the read control unit 103 performs first read control, the read control unit 103 at least performs control of storing the logical address used in first read control into the second storage unit 113. For example, the read control unit 103 can also store the logical address used in the first read control and the data read according to the first read control in association with each other with in the capacity of the second storage unit 113 (for example, a third storage unit 130, which will be described later).

Furthermore, when storing a logical address used in the first read control or the second read control into the second storage unit 113, the read control unit 103 also stores time information indicating the time at which the information is read from the first storage unit 120 in association therewith. Accordingly, in the present embodiment, the second storage unit 113 stores time information indicating the time at which reading is performed (the time at which the first read control or the second read control is performed) in association with each logical address used in the first read control or the second read control. More specific details of the second storage unit 113 will be described later.

In a case where the size of the data to be written is smaller than a threshold, the aforementioned write control unit 102 selects a logical address used for reading within a predetermined time period by the read control unit 103 before writing of the data to be written is requested (before the write request is received) from among logical addresses stored in the second storage unit 113 and adds the selected logical address to the data to be written. More specifically, in a case where the size of the data to be written is smaller than the threshold, the write control unit 102 selects a logical address associated with time information indicating time contained in the predetermined time period from among the logical addresses stored in the second storage unit 113 and adds the selected logical address to the data to be written.

Figure 4:
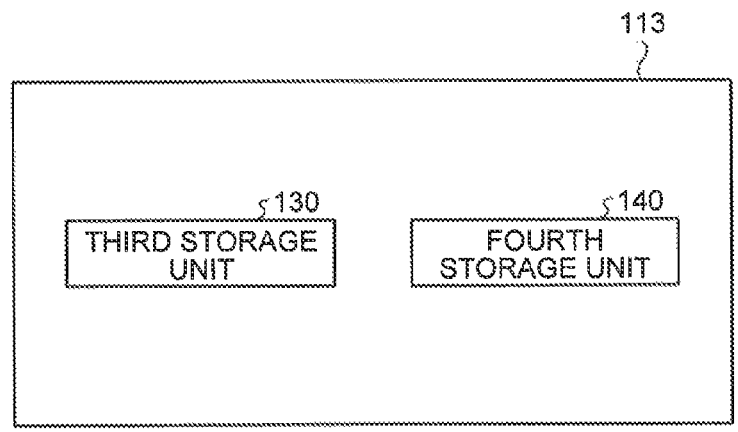
FIG. 4 is a diagram illustrating an exemplary configuration of a second storage unit according to the first embodiment.

More specific details are as follows. In the present embodiment, as illustrated in FIG. 4, the second storage unit 113 includes the third storage unit 130 and a fourth storage unit 140. The third storage unit 130 stores time information indicating the time at which reading is performed according to the first read control in association with each logical address used in the first read control. The fourth storage unit 140 stores data read according to the second read control and time information indicating the time at which reading is performed according to the second read control in association with each logical address used in the second read control. In a case where the size of the data to be written is smaller than the threshold, the write control unit 102 then selects a logical address (which may be a logical address used in the first read control or a logical address used in the second read control) associated with time information indicating time within the predetermined time period from among logical addresses stored in the third storage unit 130 and the fourth storage unit 140 and adds the selected logical address to the data to be written.

Note that the predetermined time period may be set to any time period such as a time period from a time point that is a preset time before a write request point representing the time point at which a write request from the host device 200 is received by the receiving unit 101 to the write request point.

In addition, the length of the predetermined time period may be set to any length. For example, however, even if the history of logical addresses used for reading after the power of the device 100 is turned on is saved and a logical address used for reading long before writing the data to be written (data requested to be written) smaller than the page size is added to the data to be written and written therewith, the correlation therebetween may be too small to produce sufficient effects of look-ahead. As a specific example, in a case of smart phones, since the time during which a smart phone is used in a day is, statistically, most often 50 minutes or shorter, it can be deemed that data read at an interval of 50 minutes or shorter before writing (a write request time point, for example) is strongly correlated with the data to be written. Accordingly, if a logical address associated with the data read at an interval of 50 minutes or shorter before writing is added to the data to be written and written therewith, data strongly correlated with the data to be written can be efficiently read out. In a case of PCs, for example, since the time during which a PC is used in a day is, statistically, shorter than three hours in the majority of cases, if a logical address associated with data at an interval shorter than three hours is added to the data to be written smaller than the page sized and written therewith, data strongly correlated with the data to be written can be efficiently read out.

In addition, for example, each time the write control performs write control, the write control unit 102 can perform control of storing a logical address contained in a write request and time information indicating the time at which the writing according to the write control in association with each other into the third storage unit 130. In this case, a time period from a time point when previous writing is performed (a time point when a previous write request is received by the receiving unit 101, for example) to a time point when the latest writing is performed can be set as the predetermined time period.

In the present embodiment, the device controller 112 includes a CPU or the like, for example, and the functions of the receiving unit 101, the write control unit 102, and the read control unit 103 are realized by executing programs stored in a ROM or the like, which is not illustrated, by the CPU. Alternatively, for example, at least some of the receiving unit 101, the write control unit 102, and the read control unit 103 may be realized by dedicated hardware circuits.

Figure 5:
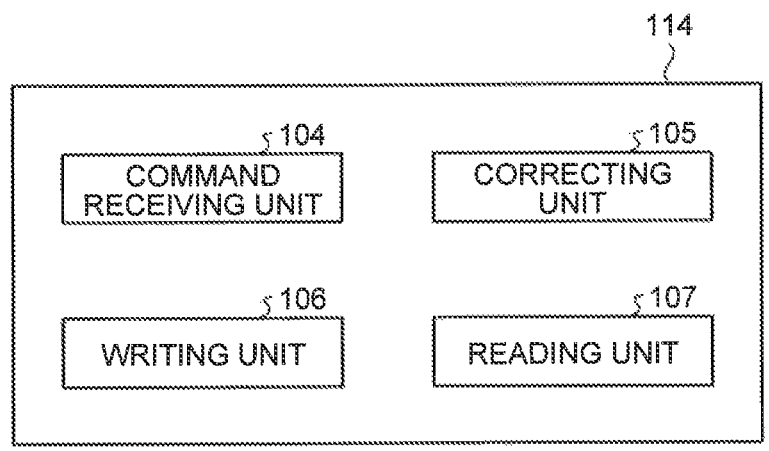
FIG. 5 is a diagram illustrating an exemplary functional configuration of a memory controller according to the first embodiment.

Next, the functions of the memory controller 114 will be described. FIG. 5 is a block diagram illustrating an exemplary functional configuration of the memory controller 114. As illustrated in FIG. 5, the memory controller 114 includes a command receiving unit 104, a correcting unit 105, a writing unit 106, and a reading unit 107.

The command receiving unit 104 receives a command (a write command or a read command) transmitted from the device controller 112. The correcting unit 105 performs an encoding process on information added to a write command received by the command receiving unit 104 (information on which write control is to be performed by the write control unit 102). In this example, the correcting unit 105 performs a process of adding redundant information (called parity when the parity of data bits is utilized) for performing an error correction process (ECC process) of bits on the information to be written into the first storage unit 120. The correcting unit 105 also performs an error correction process (ECC process) on information read out from the first storage unit 120 by the reading unit 107, which will be described later. Herein, the second storage unit 113 further has a work area for the encoding process performed by the correcting unit 105. The second storage unit 113 further has a work area for the error correction process performed by the correcting unit 105. Thus, the second storage unit 113 also functions as a working memory for the encoding process and the error correction process performed by the correcting unit 105.

The writing unit 106 writes the information into the first storage unit 120 according to the write command received by the command receiving unit 104. More specifically, the writing unit 106 write information encoded by the correcting unit 105 into an area in the first storage unit 120 indicated by a physical address added to the write command. The reading unit 107 reads out information from the first storage unit 120 according to a read command received by the command receiving unit 104. More specifically, the reading unit 107 reads out information stored in an area in the first storage unit 120 indicated by a physical address added to the read command. The information read out by the reading unit 107 is decoded through an error correction process performed by the correcting unit 105, and the decoded information is transmitted to the device controller 112 (the read control unit 103) as a response to the read command.

In the present embodiment, the memory controller 114 is a hardware module and the command receiving unit 104, the correcting unit 105, the writing unit 106, and the reading unit 107 are realized by dedicated hardware circuits. Alternatively, for example, the memory controller 114 may include a CPU or the like, and at least some functions of the command receiving unit 104, the correcting unit 105, the writing unit 106, and the reading unit 107 may be realized by executing programs stored in a ROM or the like, which is not illustrated, by the CPU.

Figure 6:
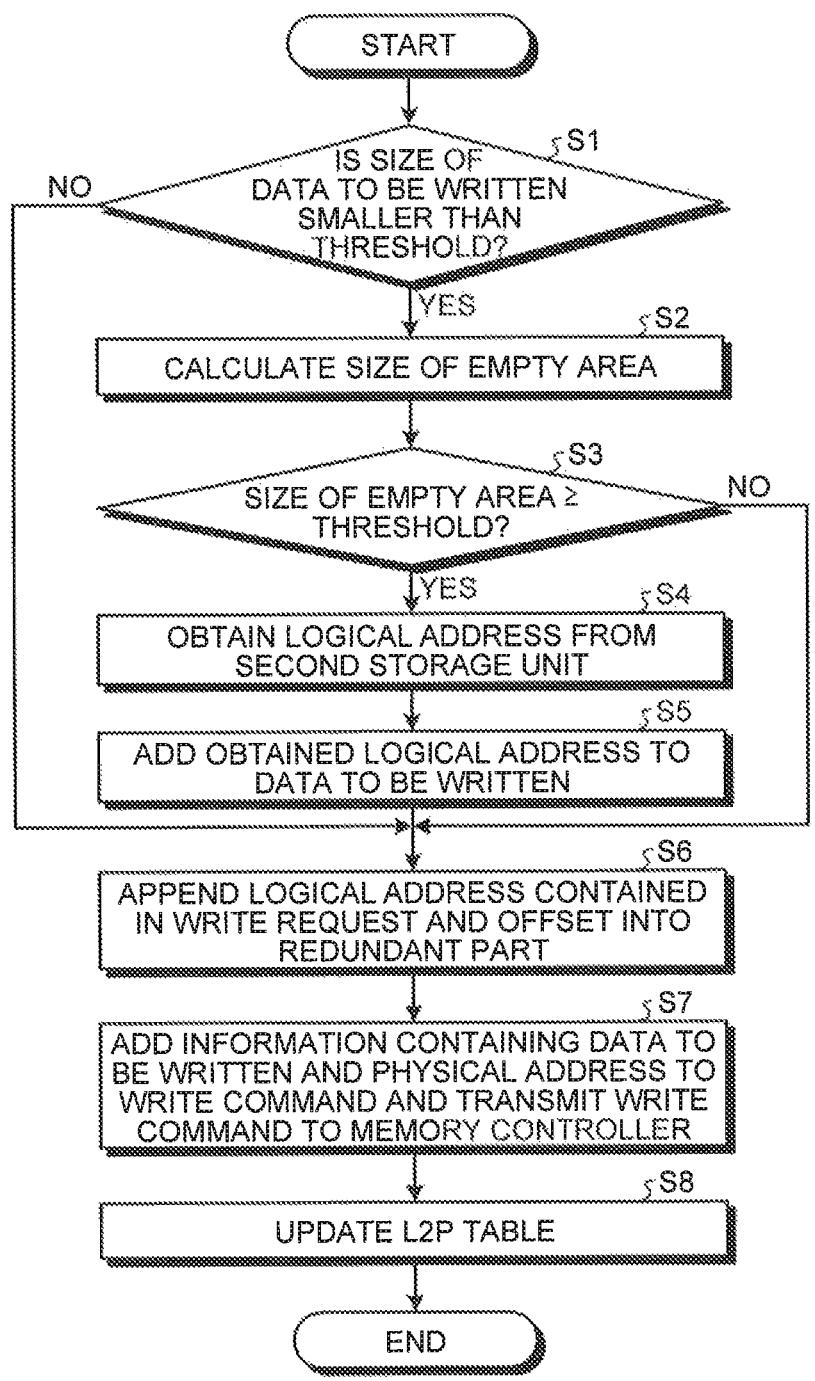
FIG. 6 is a chart illustrating an example of control performed by a write control unit according to the first embodiment.

Next, an example of control performed by the write control unit 102 described above will be described with reference to FIG. 6. FIG. 6 is a flowchart illustrating an example of the control performed by the write control unit 102. In this example, description will be made on the assumption that a write request from the hose device 200 is received by the receiving unit 101. As illustrated in FIG. 6, the write control unit 102 checks whether or not the size of data (data to be written) contained in the write request is smaller than the threshold (step S1). In the present embodiment, the write control unit 102 checks whether or not the proportion of the data to be written in a page is smaller than 50% as described above. If it is determined that the size of the data to be written is equal to or larger than the threshold (step S1: NO), the process proceeds to step S6, which will be described later.

If it is determine in step S1 that the size of the data to be written is smaller than the threshold (step S1: YES), the write control unit 102 calculates the size of the empty area (step S2). Subsequently, the write control unit 102 checks whether or not the calculated size of the empty area is equal to or larger than a threshold (step S3). This threshold is set to a value allowing determination on whether or not the size of an empty area is equal to or larger than the size of at least one logical address. If it is determined that the calculated size of the empty area is smaller than the threshold (step S3: NO), the process proceeds to step S6, which will be described later.

If on the other hand, it is determined that the calculated size of the empty area is equal to or larger than the threshold (step S3: YES), the write control unit 102 obtains (selects) a logical address associated with time information indicating time within the predetermined time period from among logical addresses stored in the second storage unit 113 (step S4). In the present embodiment, the write control unit 102 selects logical addresses each associated with time information indicating time within the predetermined time period from among logical address stored in the third storage unit 130 and the fourth storage unit 140 sequentially from the logical address associated with the earliest time within the calculated size of the empty area.

Subsequently, the write control unit 102 adds one or more logical addresses selected in step S4 to the data to be written (step S5). Subsequently, the write control unit 102 appends a logical address contained in the write request received by the receiving unit 101 and an offset allowing the data length of the data to be written to be obtained into the redundant part representing an area for redundant data in the page size that is the unit for writing (step S6). Subsequently, the write control unit 102 generates a write command instructing the memory controller 114 to perform writing, adds information on which write control is to be performed and a physical address indicating the position in the first storage unit 120 at which the data to be written is to be written to the generated write command, and transmits the write command to the memory controller 114 (step S7). The memory controller 114 in receipt of the write command from the write control unit 102 then writes the information into the first storage unit 120 according to the received write command. When writing according to the received write command is completed, the memory controller 114 transmits notification information informing that writing is completed as a response to the write command to the write control unit 102. This allows the write control unit 102 to know that the writing is completed.

Subsequently, the write control unit 102 updates the logical-to-physical translation table (L2P table) (step S8). As described above, in the present embodiment, the write control unit 102 performs control of newly adding the logical address contained in the write request received by the receiving unit 101 and the physical address indicating the position in the first storage unit 120 at which the data to be written is written in association with each other into the logical-to-physical translation table.

Figure 7:
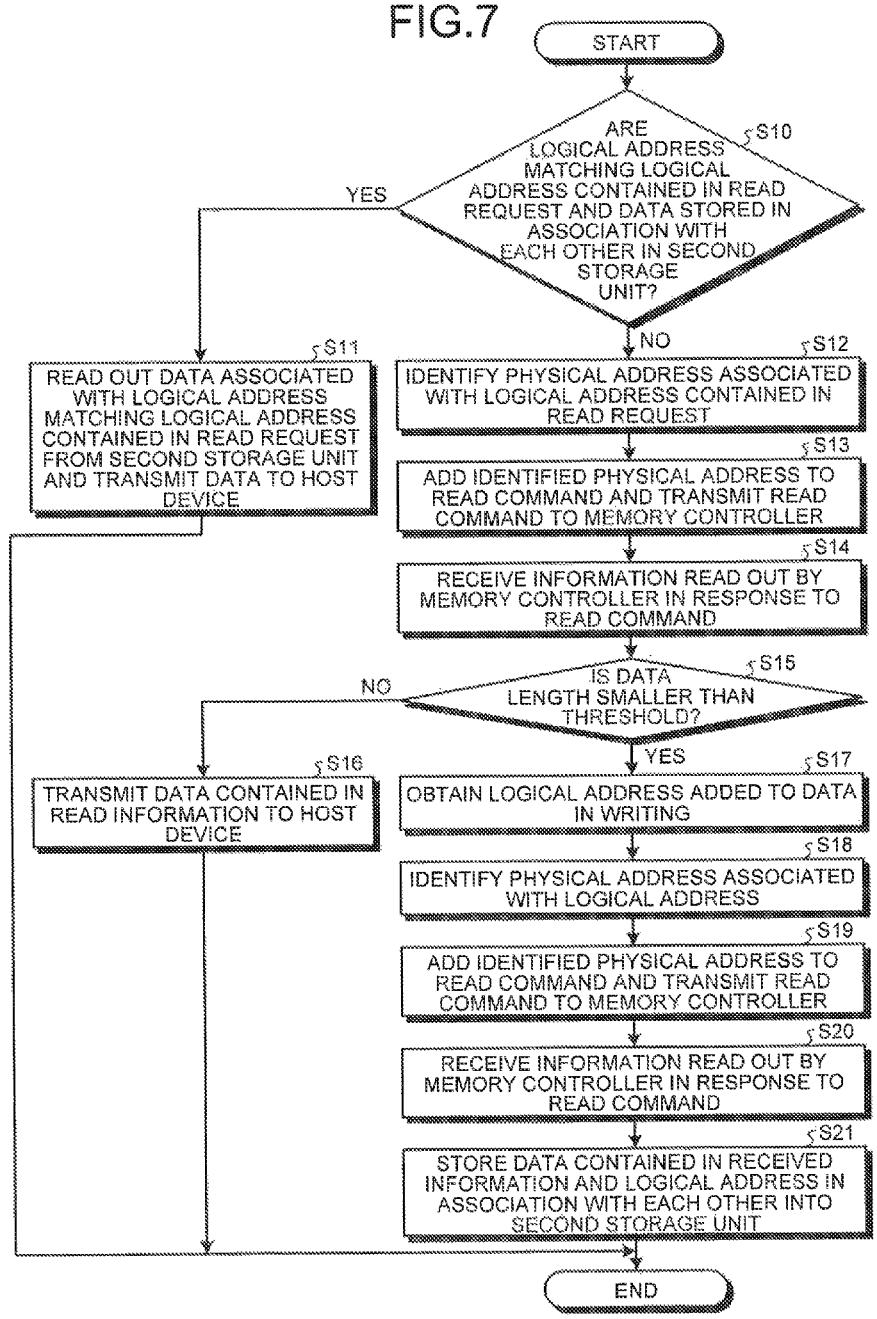
FIG. 7 is a chart illustrating an example of control performed by a read control unit according to the first embodiment.

Next, an example of control performed by the read control unit 103 described above will be described with reference to FIG. 7. FIG. 7 is a flowchart illustrating an example of the control performed by the read control unit 103. In this example, description will be made on the assumption that a read request from the host device 200 is received by the receiving unit 101. As illustrated in FIG. 7, the read control unit 103 first checks whether or not a logical address matching the logical address contained in the read request and data are stored in association with each other in the second storage unit 113 (step S10). In the present embodiment, the read control unit 103 checks whether or not cache data containing the logical address contained in the read request is stored in the fourth storage unit 140 as described above.

If it is determined in step S10 that a logical address matching the logical address contained in the read request and data are stored in association with each other in the second storage unit 113 (step S10: YES), that is, if it is determined that cache data containing the logical address contained in the read request is present, the read control unit 103 reads out the data associated with the logical address matching the logical address contained in the read request from the second storage unit 113, and transmits the read data as a response to the read request to the host device 200 (step S11). The processing in step S11 corresponds to the third read control. If, on the other hand, it is determined in step S10 that a logical address matching the logical address contained in the read request and data are not stored in association with each other in the second storage unit 113 (step S10: NO), that is, if it is determined that cache data containing the logical address contained in the read request is not present, the process proceeds to step S12.

In step S12, the read control unit 103 refers to the logical-to-physical translation table to identify the physical address associated with the logical address contained in the read request (step S12). Subsequently, the read control unit 103 generates a read command to instruct the memory controller 114 to perform reading, adds the physical address identified in step S12 to the generated read command, and transmits the read command to the memory controller 114 (step S13). The memory controller 114 in receipt of the read command reads out information from the first storage unit 120 and transmits the read information to the read control unit 103 according to the received read command. Thus, the read control unit 103 receives the information read out by the memory controller 114 as a response to the read command (step S14).

The processing in steps S12 to S14 corresponds to the first read control. Subsequently, the read control unit 103 refers to the offset contained in the information read out according to the first read control of checking whether or not the data length is smaller than the threshold (step S15). In the present embodiment, the read control unit 103 checks whether or not the proportion of the data length in a page is smaller than 50% as described above. If it is determined that the data length is equal to or larger than the threshold (step S15: NO), the read control unit 103 transmits data contained in the information read out according to the first read control as a response to the read request to the host device 200 (step S16).

If, on the other hand, it is determined in step S15 that the data length is smaller than the threshold (step S15: YES), the read control unit 103 obtains a logical address added to the data in writing from the part other than the data and the redundant part of the information read out according to the first read control (step S17). In the present embodiment, the read control unit 103 may also transmit data smaller than the threshold contained in the information read out according to the first read control as a response to the read request to the host device 200 in parallel with the processing in step S17. Note that the timing at which the data smaller than the threshold contained in the information read out according to the first read control is transmitted to the host device 200 can be alternatively changed to any timing.

Subsequently, the read control unit 103 refers to the logical-to-physical translation table to identify a physical address associated with each of the one or more logical addresses obtained in step S17 (step S18). Subsequently, the read control unit 103 generates a read command to instruct the memory controller 114 to perform reading, adds the physical address identified in step S18 to the generated read commend, and transmits the read command to the memory controller 114 (step S19). The memory controller 114 in receipt of the read command reads out information from the first storage unit 120 and transmits the read information to the read control unit 103 according to the received read command. Thus, the read control unit 103 receives the information read out by the memory controller 114 as a response to the read command (step S20).

The processing in steps S17 to S20 corresponds to the second read control. After step S20, the read control unit 103 performs control of storing the data contained in the information received by the memory controller 114 (the information read out according to the second read control) and the logical address in association with each other into the second storage unit 113 (the fourth storage unit 140) (step S21). As a result, cache data read ahead is newly added to the fourth storage unit 140.

According to the present embodiment, since the logical address used for reading (the logical address associated with read data) is added to the data to be written and written therewith into the first storage unit 120 in a case where the size of the data to be written is smaller than the threshold as described above, it is possible to prevent a wasteful empty area from being produced in the first storage unit 120 to which the data is written.

In the present embodiment, a logical address used for reading within a predetermined time period before the time at which writing of data to be written is requested is employed as the logical address to be added to the data to be written smaller than the threshold. Then, when reading of the written data smaller than the threshold is requested after the data is written into the first storage unit 120, the logical address added In writing is also read out together with the written data. Since data associated with the read logical address is then read out (read ahead) from the first storage unit 120 and held in the second storage unit 113 as cache data associated with the logical address, when there is a request for reading data read ahead, it is possible to transmit the data to the host device 200 without accessing to the first storage unit 120. Thus, according to the present embodiment, it is possible to produce an advantageous effect that data strongly correlated with written data can be efficiently read out while preventing a wasteful empty area to be produced in the first storage unit 120.

Modification 1 of First Embodiment

A mode in which a logical address contained in cache data read ahead, for example, is not added to data to be written smaller than the threshold may be applied. In this case, since the fourth storage unit 140 need not hold time information, the fourth storage unit 140 only needs to store the logical address used in the second read control and data read out according to the second read control in association with each other. In a case where the size of the data to be written is smaller than the threshold, the write control unit 102 then performs control of selecting a logical address associated with time information indicating time within the predetermined time period from among logical addresses stored in the third storage unit 130 and add the selected logical address to the data to be written.

Modification 2 of First Embodiment

The third storage unit 130 may be a FIFO (first-in-first-out) memory, for example. Thus, when the storage amount of logical addresses exceeds the capacity of the third storage unit 130, the logical addresses are deleted sequentially from the oldest one.

Modification 3 of First Embodiment

Figure 8:
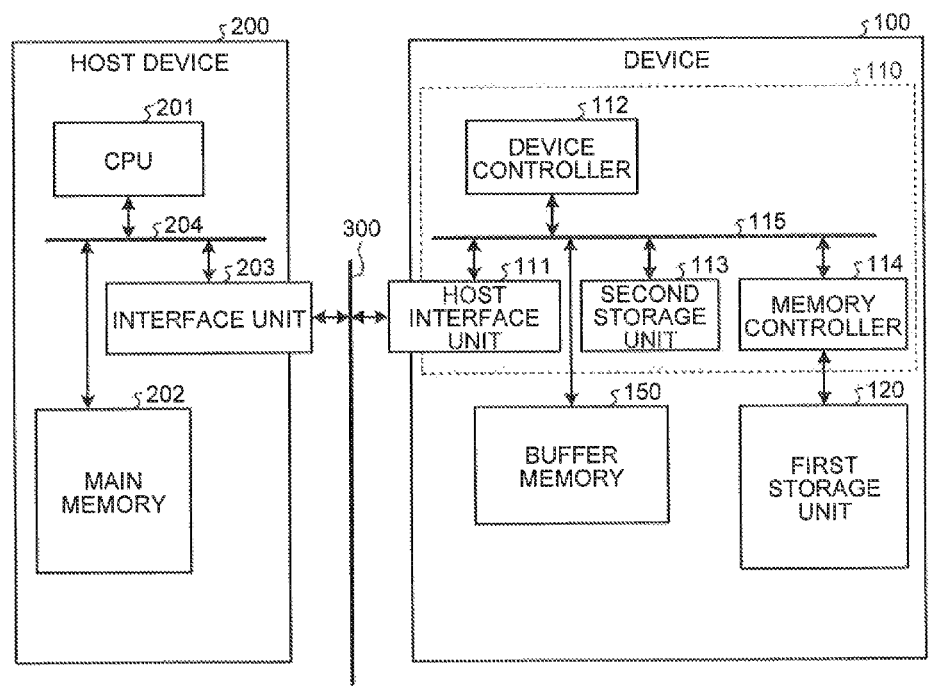
FIG. 8 is a diagram illustrating an exemplary hardware configuration of a semiconductor storage device according to a modification.

A mode in which a buffer memory 150 is provided separately from the second storage unit 113 (separately from the controller chip 110) as illustrated in FIG. 8 may be applied so as to reserve a sufficient working area for storing various computation results from the device controller 112 and the memory controller 114, for example. In the example of FIG. 8, the buffer memory 150 is connected to the bus 115 in the controller chip 110. When the second storage unit 113 is an SRAM and the buffer memory 150 is a DRAM, for example, the logical-to-physical translation table stored in the first storage unit 120 may be temporarily transferred to the buffer memory 150 and part thereof may then be transferred to the second storage unit 113 for use since the access speed (reading/writing speed) of the SRAM is higher than that of the DRAM.

Second Embodiment

Next, a second embodiment will be described. Parts that are the same as those in the first embodiment described above will be designated by the same reference numerals and description thereof will not be repeated as appropriate. A semiconductor storage device according to the second embodiment has a search function in addition to the write/read functions described in the first embodiment. The search scheme and method will be described below before description of the semiconductor storage device according to the second embodiment.

For effectively retrieving data such as a text associated with another text, a specific bit pattern in a binary file, a specific pattern in a video file and a distinctive audio pattern in an audio file that are stored in a semiconductor storage device, a data read function specifying data is desired. Accordingly, a method of storing data with metadata associated therewith in advance and referring to the metadata so as to obtain desired data is used. One method for managing metadata is a key-value store (KVS) in which data have one-to-one or one-to-many relationships. In the KVS, when a key is supplied as a search request, a value associated therewith is then output.

The semiconductor storage device in the second embodiment processes KVS data (key-value information) efficiently and at a high speed by using an address translation table. This address translation table is referred to as a K2P table that is a translation table between fixed-length addresses (key addresses) obtained from keys and physical addresses. A specific example of processing for retrieving KVS data will be described below. In general, the KVS refers to a database management technique in which sets of keys and values are written allowing a value to be read out by specifying a key. In general, the KVS is often used over a network. The storage of data is inevitably a certain local memory or a certain storage system.

Data is usually read by specifying the top address of the memory in which the data is stored and the data length. Data addresses are managed in units of a 512-byte sector, for example, by an OS or a file system of the host system. Alternatively, if the file system need not be limited, data addresses may be managed in units of 4-KB or 8-KB in conformity with the read/write page size of the NAND flash memory, for example.

The simplest search procedures are as the following (1) to (3).

(1) Convert a key to fixed-length data by a hash function or the like and translate the fixed-length data to an address of an available memory to obtain a fixed-length address. Set the fixed-length address resulting from the translation to a key address.
(2) Refer to a K2P table saved in NAND flash memory to obtain a physical address.
(3) Read data at the physical address and output the read data to outside of the memory system.

Such relationships between real data addresses and KVS data and relationships between keys and values correspond to relationships between elements and sets. Specifically, in a typical file, when a file with a file name of "a-file.txt" is a set and there is text data of "This is a book" in the file, for example, each word thereof is an element.

In the case of key/value, when placed in a metadata address space, the relationships between sets and elements are reversed and rearranged. That is, the relationships may be converted to "inverted" relationships and saved. For example, in a set of "book", file names of "a-file.txt" and "b-file.txt" are saved as elements. In the case of key/value, the rearranged set name ("book") is searched for and elements ("a-file.txt", "b-file.txt") thereof are requested. These are practically procedures of creation of inverted files and search typically performed in full-text search, which can be said to be one practical example of key/value.

For manufacturing a searcher and storage in the KVS method using K2P as described above, it is desirable to provide a nonvolatile buffer memory for storage in response to a search request. Furthermore, since the K2P table is read out from the NAND flash memory and expanded in the buffer memory, the buffer memory is desirably nonvolatile so as to be ready for sudden power cut-off. In practice, it is rare that the number of search requests is one but a plurality of search results are processed in a device. It is thus desirable to provide a high-speed nonvolatile buffer memory for efficiently performing search operation, that is, set operation such as AND, OR, and NOT. Since a search request must certainly be sacred in the nonvolatile buffer until data processing is completed, a nonvolatile memory having long-term reliability is desirable.

Specific details of the semiconductor storage device according to the second embodiment will be described below. Since the basic configuration is similar to that of the device 100 according to the first embodiment, the part relating to the search function will mainly be described.

Figure 9:
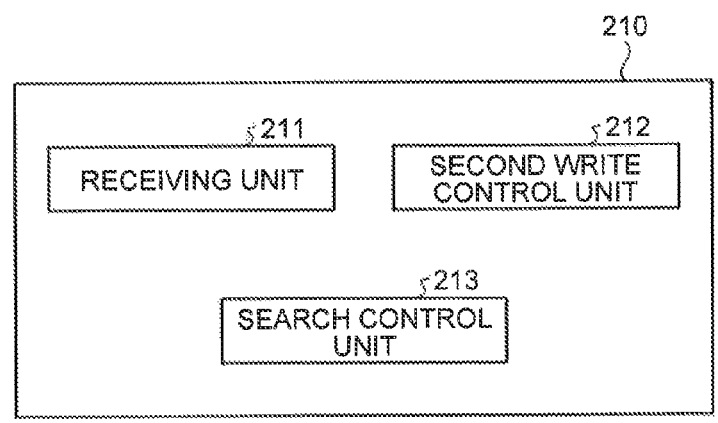
FIG. 9 is a diagram illustrating an exemplary functional configuration of a device controller according to a second embodiment.

FIG. 9 is a block diagram illustrating an exemplary functional configuration of a device controller 210 according to the second embodiment, in which only the part relating to the search function is illustrated. As illustrated in FIG. 9, the device controller 210 includes a receiving unit 211, a second write control unit 212, and a search control unit 213. In this example, the second write control unit 212 corresponds to a "write control unit" in claim 11.

A second storage unit 220 of the second embodiment stores a key address used for searching for data associated with a key specified by the host device 200 from among data stored in the first storage unit 120. Details of the second storage unit 220 will be described later.

A memory controller 250 according to the second embodiment performs writing and reading of information into and from the first storage unit 120 under the control of the device controller 210 similarly to the first embodiment. Since the functions of the memory controller 250 are substantially the same as in the first embodiment, detailed description thereof will not be repeated here.

Referring back to FIG. 9, description will be made on the functions of the device controller 210. The receiving unit 211 receives requests from the host device 200. Here, the receiving unit 211 receives a key-value write request requesting to write a combination of data and a key representing metadata associated with the data, a search request requesting to search for data associated with a specified key, a set operation condition for narrowing search results, and the like. A key-value write request contains information requesting to perform writing and a combination of key and data (a set of key-value), and a search request contains information requesting to perform a search and a key specified by the host device 200.

Next, functions of the second write control unit 212 will be described. When a key-value write request is received by the receiving unit 211, the second write control unit 212 hashes a key contained in the key-value write request to convert the key into a key address made of fixed-length data. The second write control unit 212 then performs control (hereinafter may be referred to as "second write control") of writing information containing data (hereinafter may be referred to as "value data to be written") contained in the key-value write request into the first storage unit 120. As will be described later, information on which second write control is to be performed may contain a key address added to the value data to be written in addition to predetermined redundant information. In the second embodiment, the second write control unit 212 generates a write command instructing to perform writing, adds information (information on which second write control is to be performed) containing value data to be written and a physical address indicating an area in the first storage unit 120 where the value data to be written is to be written to the generated write command, and transmits the write command to the memory controller 250.

In a case where the size of the value data to be written is smaller than a threshold, the second write control unit 212 performs control of adding a key address stored in the second storage unit 220 (a key address used for searching for data related to the key specified by the host device 200) to the value data to be written and write the resulting value data into the first storage unit 120. In the second embodiment, in a case where the proportion of the value data to be written in a page is smaller than 50%, the second write control unit 212 performs control of adding the key address stored in the second storage unit 220 to the value data to be written so that there will be no empty area other than the area for the redundant part in the page, append at least an offset representing information allowing the length of the value data to be written to be obtained into the redundant part, and write the resulting data into the first storage unit 120. In this case, the information on which the second write control is to be performed includes the value data to be written having a size smaller than the threshold, the key address added to the value data to be written, and the redundant information at least containing an offset) described in the redundant part.

Furthermore, the second write control unit 212 performs control of updating address translation information (hereinafter may also be referred to as a "K2P table") indicating an association between a key address obtained by converting a key specified by the host device 200 and a physical address indicating a position in the first storage unit 120 each time the second write control unit 212 performs the second write control. More specifically, the second write control unit 212 performs control of newly adding the key address obtained by converting the key contained in the key-value write request received from the host device 200 and the physical address indicating the position in the first storage unit 120 into which the value data to be written is written in association with each other to the K2P table each time the second write control unit 212 performs the second write control. In this example, the body of the K2P table is stored in the first storage unit 120. For performing address translation (K2P translation), the K2P table is read into the second storage unit 220 and used. The content of the K2P table is updated each time the second write control is performed by the second write control unit 212.

Next, functions of the search control unit 213 will be described. When a search request is received by the receiving unit 211, the search control unit 213 hashes a key contained in the search request to convert the key into a key address made of fixed-length data. The search control unit 213 then performs control (hereinafter may be referred to as "first search control") of referring to the K2P table to identify a physical address associated with the key address (performs K2P translation), and control of reading out information stored at the position indicated by the identified physical address. In the present embodiment, the search control unit 213 generates a search command to instruct the memory controller 250 to perform a search, adds the physical address obtained by the K2P translation to the generated search command, and transmits the search command to the memory controller 250. Then, the search control unit 213 can receive the information read out from the first storage unit 120 by the memory controller 250 as a response to the search command.

When a set operation condition is received together with a plurality of search requests from the host device 200, for example, the search control unit 213 may perform set operation on a set of data contained in the information read out from the first storage unit 120 by using the key addresses obtained by converting keys in the respective search requests according to the received set operation condition to narrow the search results. Note that a mode in which this function of performing set operation is implemented by the memory controller 250 instead of the device controller 210 may be applied, for example.

When a key address added to data by the second write control unit 212 is contained in the information read out according to the first search control, the search control unit 213 refers to the K2P table to identify the physical address associated with the key address added to the data by the second write control unit 212. In the present embodiment, the search control unit 213 refers to the offset contained in the information read out according to the first search control, and obtains the key address added to the data in writing from the part other than the data and the redundant part of the information read out according to the first search control if it is determined that the data length is smaller than the threshold. The search control unit 213 then refers to the K2P table to identify the physical address associated with the obtained key address.

The search control unit 213 performs control (hereinafter may be referred to as "second search control") of reading out information stored at a position in the first storage unit 120 indicated by the physical address identified as described above. In the present embodiment, the search control unit 213 generates a search command to instruct the memory controller 250 to perform a search, adds the physical address identified as described above to the generated search command, and transmits the search command to the memory controller 250. The search control unit 213 can receive the information read out from the first storage unit 120 by the memory controller 250 as a response to the search command. The search control unit 213 then performs control of storing the data contained in the information read out according to the second search control described above and the key address in association with each other into the second storage unit 220.

Accordingly, each time the second search control is performed, search cache data containing a key address used for the second search control and data in association with each other is stored into the second storage unit 220.

When search cache data containing a key address matching the key address obtained by converting the key contained in the search request received by the receiving unit 211 is present in the second storage unit 220, the search control unit 213 performs control of reading out data contained in the search cache data containing the key address obtained by converting the key contained in the search request. In this case, the search control unit 213 need not perform control of reading out data from the first storage unit 120, which can increase the reading speed.

Furthermore, each time the search control unit 213 performs the first search control, the search control unit 213 at least performs control of storing the key address used in first search control into the second storage unit 220.

Furthermore, when storing a key address used in the first search control or the second search control into the second storage unit 220, the search control unit 213 also stores time information indicating the time at which the information is read from the first storage unit 120 in association therewith. Accordingly, the second storage unit 220 stores time information indicating the time at which reading is performed in association with each key address used in the first search control or the second search control. More specific details of the second storage unit 220 will be described later.

In a case where the size of value data to be written is smaller than a threshold, the aforementioned write control unit 212 selects a key address used for searching within a predetermined time period before writing of the value data to be written is requested from among key addresses stored in the second storage unit 220 and adds the selected key address to the value data to be written.

Figure 10:
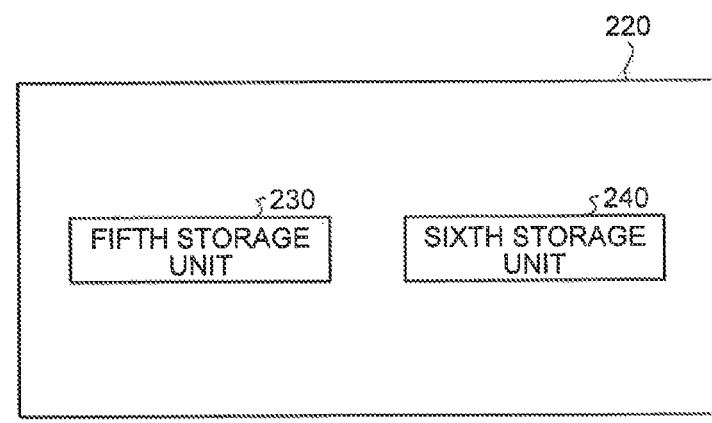
FIG. 10 is a diagram illustrating an exemplary configuration of a second storage unit according to the second embodiment.

More specific details are as follows. FIG. 10 is a block diagram illustrating an exemplary functional configuration of the second storage unit 220 according to the second embodiment, in which only the part relating to the search function is illustrated. As illustrated in FIG. 10, the second storage unit 220 includes a fifth storage unit 230 and a sixth storage unit 240. The fifth storage unit 230 stores time information indicating the time at which reading is performed according to the first search control in association with each key address used in the first search control. The sixth storage unit 240 stores data read out according to the second search control and time information indicating the time at which reading is performed according to the second search control in association with each key address used in the second search control. In a case where the size of the value data to be written is smaller than the threshold, the second write control unit 212 then selects a key address associated with time information indicating time within the predetermined time period from among key addresses stored in the fifth storage unit 230 and the sixth storage unit 240 and adds the selected key address to the data. Alternatively, a mode in which a key address contained in search cache data read ahead (a key address stored in the sixth storage unit 240), for example, is not added to the value data to be written having a size smaller than the threshold may be applied.

Next, an example of control performed by the second write control unit 212 will be described with reference to FIG. 11. FIG. 11 is a flowchart illustrating an example of the control performed by the second write control unit 212. In this example, description will be made on the assumption that a key-value write request from the host device 200 is received by the receiving unit 211. As illustrated in FIG. 11, the second write control unit 212 checks whether or not the size of data (value data to be written) contained in the key-value write request received by the receiving unit 211 is smaller than the threshold (step S30). In this example, the second write control unit 212 checks whether or not the proportion of the value data to be written in a page is smaller than 50%. If it is determined that the size of the value data to be written is equal to or larger than the threshold (step S30: NO), the process proceeds to step S35, which will be described later.

If it is determine in step S30 that the size of the value data to be written is smaller than the threshold (step 530: YES), the second write control unit 212 calculates the size of the empty area (step S31). Subsequently, the second write control unit 212 checks whether or not the calculated size of the empty area is equal to or larger than a threshold (step S32). This threshold is set to a value allowing determination on whether or not the size of an empty area is equal to or larger than the size of at least one key address. If it is determined that the calculated size of the empty area is smaller than the threshold (step S32: NO), the process proceeds to step S35, which will be described later.

If, on the other hand, it is determined that the calculated size of the empty area is equal to or larger than the threshold (step S32: YES), the second write control unit 212 obtains (selects) a key address associated with time information indicating time within the predetermined time period from among key addresses stored in the second storage unit 220 (step S33).

Subsequently, the second write control unit 212 adds the one or more key addresses selected in step S33 to the value data to be written (step S34). Subsequently, the second write control unit 212 appends a key address obtained by converting a key contained in the key-value write request received by the receiving unit 211 and an offset allowing the data length of the value data to be written to be obtained into the redundant part (step S35). Subsequently, the second write control unit 102 generates a write command instructing the memory controller 250 to perform writing, adds information on which second write control is to be performed and a physical address indicating the position in the first storage unit 120 at which the value data to be written is to be written to the generated write command, and transmits the write command to the memory controller 250 (step S36). The memory controller 250 in receipt of the write command from the second write control unit 212 then writes the information into the first storage unit 120 according to the received write command.

Subsequently, the second write control unit 212 updates the K2P table (step S37). In the second embodiment, the second write control unit 212 performs control of newly adding the key address obtained by converting the key contained in the key-value write request received by the receiving unit 211 and the physical address indicating the position in the first storage unit 120 into which the value data to be written is written in association with each other to the K2P table as described above.

Next, an example of control performed by the search control unit 213 will be described with reference to FIG. 12. FIG. 12 is a flowchart illustrating an example of the control performed by the search control unit 213. In this example, description will be made on the assumption that a set operation condition for narrowing search results is received together with a plurality of search requests from the host device 200. As illustrated in FIG. 12, the search control unit 213 first checks whether or not search cache data containing a key address obtained by converting a key contained in a search request is stored in the second storage unit 220 (the sixth storage unit 240) (step S40).

If it is determined in step S40 that the search cache data containing the key address obtained by converting the key contained in the search request is stored in the second storage unit 220 (step S40: YES), the search control unit 213 reads out data contained in the search cache data from the second storage unit 220. Here, if a set operation condition is not received by the receiving unit 211 (that is, in a case of a single search request), the search control unit 213 transmits the data read out from the second storage unit 220 as a response to the search request to the host device 200 and ends the process. Since, however, it is assumed in this example that a set operation condition is received by the receiving unit 211 together with a plurality of search requests, the process proceeds to step S45, which will be described later.

If, on the other hand, it is determined in step S40 that no search cache data containing the key address obtained by converting the key contained in the search request is stored in the second storage unit 220 (step S40: NO), the process proceeds to step S41. In step S41, the search control unit 213 refers to the K2P table to identify the physical address associated with the key address obtained by converting the key contained in the search request (step S41). Subsequently, the search control unit 213 generates a search command to instruct the memory controller 250 to perform a search, adds the physical address identified in step S41 to the generated search command, and transmits the search command to the memory controller 250 (step S42). The memory controller 250 in receipt of the search command reads out information from the first storage unit 120 and transmits the read information to the search control unit 213 according to the received search command. Thus, the search control unit 213 receives the information read out by the memory controller 250 as a response to the search command (step S43).

The processing in steps S41 to S43 corresponds to the first search control. Subsequently, the search control unit 213 refers to the offset contained in the information read out according to the first search control of checking whether or not the data length is smaller than the threshold (step S44). If no set operation condition is received by the receiving unit 211 (in the case of a single search request), and if it is determined that the data length is equal to or larger than the threshold (step S44: NO), the search control unit 213 transmits data contained in the information read out according to the first search control to the host device 200 as a response to the search request, and ends the process. Since, however, it is assumed in this example that a set operation condition is received by the receiving unit 211 together with a plurality of search requests, the process proceeds to step S45. In step S45, the search control unit 213 performs set operation on a set of data contained in the information read out by using the key addresses obtained by converting keys in the respective search requests according to the received set operation condition to narrow the search results. The search control unit 213 the transmits the search results narrowed by the set operation to the host device 200 as a response to the search requests (step S46), and ends the process.

If, on the other hand, it is determined in step S44 that the data length is smaller than the threshold (step S44: YES), the search control unit 213 obtains a key address added to the data in writing from the part other than the data and the redundant part of the information read out according to the first search control (step S47). In the present embodiment, the search control unit 213 may also perform the processing in step S45 (set operation) by using the data smaller than the threshold contained in the information read out according to the first search control in parallel with the processing in step S47. If no set operation condition is received by the receiving unit 211 (in the case of a single search request), for example, the search control unit 213 transmits data smaller than the threshold contained in the information read out according to the first search control to the host device 200 as a response to the search request, and ends the process.

Subsequently, the search control unit 213 refers to the K2P table to identify the physical address associated with each of the one or more key addresses obtained in step S47 (step S48). Subsequently, the search control unit 213 generates a search command to instruct the memory controller 250 to perform a search, adds the physical address identified in step S48 to the generated search command, and transmits the search command to the memory controller 250 (step S49). The memory controller 250 in receipt of the search command reads out information from the first storage unit 120 and transmits the read information to the search control unit 213 according to the received search command. Thus, the search control unit 213 receives the information read out by the memory controller 250 as a response to the search command (step S50).

The processing in steps S47 to S50 corresponds to the second search control. After step S50, the search control unit 213 then performs control of storing the data contained in the information received from the memory controller 250 (the information read out according to the second search control) and the key address in association with each other into the second storage unit 220 (the sixth storage unit 240) (step S51). As a result, cache data read ahead is newly added to the sixth storage unit 240.

The programs to be executed by the device controller (112, 210) according to the embodiments described above may be stored on a computer system connected to a network such as the Internet, and provided by being downloaded via the network. Alternatively, the programs to be executed by the device controller (112, 210) according to the embodiments described above may be provided or distributed through a network such as the Internet. Still alternatively, the programs to be executed by the device controller (112, 210) according to the embodiments described above may be embedded on a nonvolatile recording medium such as a ROM or the like in advance and provided therefrom.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device, comprising:
a first storage unit configured to store data supplied from a host device;
a read control unit configured to perform control of reading the data in accordance with a read request;
a second storage unit configured to store a logical address used for reading the data from the first storage unit by the read control unit; and
a write control unit configured to perform control of adding the stored logical address to the data and write the resulting data into the first storage unit in a case where a size of the data requested to be written into the first storage unit by the host device is smaller than a threshold.

2. The device according to claim 1, further comprising:
a receiving unit configured to receive from the host device the read request for reading the data from the first storage unit, wherein
the read control unit is configured to perform first read control when the receiving unit receives the read request, the first read control being to
refer to logical-to-physical translation information indicating an association between a physical address indicating a position in the first storage unit and the logical address to identify the physical address associated with the logical address contained in the read request, and
read out information containing the data stored at the position indicated by the identified physical address.

3. The device according to claim 2, wherein
the read control unit is configured to perform second read control when the logical address added to the data by the write control unit is contained in the information read out according to the first read control,
the second read control being to read out the information stored at the position indicated by the physical address associated with the logical address added to the data, and
the read control unit is configured to perform control of storing the data contained in the information read out according to the second read control and the logical address in association with each other into the second storage unit.

4. The device according to claim 3, wherein the read control unit is configured to perform third read control when the logical address matching the logical address contained in the read request received by the receiving unit and the data are stored in association with each other in the second storage unit, the third read control being to read out the data associated with the logical address matching the logical address contained in the read request from the second storage unit.

5. The device according to claim 2, wherein the read control unit is configured to perform control of storing at least the logical address used in the first read control into the second storage unit each time the read control unit performs the first read control.

6. The device according to claim 5, wherein the write control unit is configured to select the logical address used for reading within a predetermined time period before the data is requested to be written and add the selected logical address to the data in a case where the size of the data requested to be written is smaller than the threshold.

7. The device according to claim 6, wherein
the second storage unit is configured to store time information indicating time at which reading of the information from the first storage unit is performed in association with each logical address, and
the write control unit is configured to select the logical address associated with the time information indicating time contained in the predetermined time period from among the logical addresses stored in the second storage unit and add the selected logical address to the data in a case where the size of the data requested to be written is smaller than the threshold.

8. The device according to claim 7, wherein
the second storage unit includes:
a third storage unit configured to store the logical address used in the first read control and the time information indicating time at which reading according to the first read control is performed in association with each other; and
a fourth storage unit configured to store the logical address used in the second read control, the data read out according to the second read control, and the time information indicating time at which the reading according to the second reading control is performed in association with one another, and
the write control unit is configured to select the logical address associated with the time information indicating time within the predetermined time period from among the logical addresses stored in the third storage unit and the fourth storage unit and add the selected logical address to the data in a case where the size of the data requested to be written is smaller than the threshold.

9. The device according to claim 8, wherein the third storage unit is a FIFO memory.

10. The device according to claim 7, wherein
the second storage unit includes
a third storage unit configured to store the logical address used in the first read control and the time information indicating time at which reading according to the first read control is performed in association with each other; and
a fourth storage unit configured to store the logical address used in the second read control and the data read out according to the second read control in association with each other, and
the write control unit is configured to select the logical address associated with the time information indicating time within the predetermined time period from among the logical addresses stored in the third storage unit and add the selected logical address to the data in a case where the size of the data requested to be written is smaller than the threshold.

11. The device according to claim 10, wherein the third storage unit is a FIFO memory.

12. A semiconductor storage device, comprising:
a first storage unit configured to store data supplied from a host device;
a second storage unit configured to store a key address used for searching for the data associated with a key specified by the host device from among the data stored in the first storage unit; and
a write control unit configured to perform control of adding the stored key address to the data and write the resulting data into the first storage unit in a case where a size of the data requested to be written into the first storage unit by the host device is smaller than a threshold.

\* \* \* \* \*